United States Patent
Kammerzell et al.

(10) Patent No.: US 7,862,011 B2
(45) Date of Patent: Jan. 4, 2011

(54) NON UNIFORM WATER DISTRIBUTION SYSTEM FOR AN EVAPORATIVE COOLER

(75) Inventors: Larry L. Kammerzell, Phoenix, AZ (US); Donald L. Kammerzell, Phoenix, AZ (US)

(73) Assignee: AZ Evap, LLC, Phoenix, AZ (US)

( * ) Notice: Subject to any disclaimer, the term of this patent is extended or adjusted under 35 U.S.C. 154(b) by 803 days.

(21) Appl. No.: 11/766,022

(22) Filed: Jun. 20, 2007

(65) Prior Publication Data

US 2008/0018001 A1    Jan. 24, 2008

Related U.S. Application Data

(63) Continuation-in-part of application No. 11/569,944, filed as application No. PCT/US2004/043748 on Dec. 23, 2004, application No. 11/766,022, filed on Jun. 20, 2007.

(60) Provisional application No. 60/885,557, filed on Jan. 18, 2007.

(51) Int. Cl.
    *B01F 3/04* (2006.01)
(52) U.S. Cl. .............................. 261/27; 261/28; 261/66; 261/97; 261/106; 261/DIG. 46
(58) Field of Classification Search ................. 261/128, 261/129, 135, 136, 27, 28, 30, 66, 97, 99, 261/106, 107, DIG. 46
    See application file for complete search history.

(56) References Cited

U.S. PATENT DOCUMENTS 1,750,047 A    3/1930    Metzger 2,497,947 A    2/1950    Lewis
3,262,682 A    7/1966    Bredberg (Continued)

OTHER PUBLICATIONS

Hays Fluid Controls, MesurFlo Automatic Balancing Valve, Flyer 10000452 Rev 03, 2007.

(Continued)

*Primary Examiner*—Scott Bushey
(74) *Attorney, Agent, or Firm*—The von Hellens Law Firm, Ltd.

(57) ABSTRACT

An evaporative cooler, including one or more media, distributes water from a source of water to each media through a constant flow valve. A distribution unit at each media includes a pair of spray bars for spraying water through two rows of uniformly spaced apertures disposed in each spray bar. A spray bar channel associated with each spray bar distributes the streams of water impinging thereupon from one row of apertures to the underlying media in specific locations. A distribution cap associated with each spray bar distributes streams of water impinging thereupon to the front and back edges of the underlying media. The water dripping from the media is drained. A fan or other air moving device draws air through the media to obtain cooled air resulting from evaporation of water flowing downwardly along the media. A microprocessor controller, responsive to any of one or more sensors for sensing the temperature of the air flowing into and out of the media, the relative humidity of the air flowing into and out of the media, the pressure differential between the upstream and downstream sides of the media, the temperature of the water flowing to the spray bars, the fan speed, and the pressure differential between the downstream side of the media and the downstream side of the fan, controls the flow of water and the fan speed.

33 Claims, 8 Drawing Sheets

CUT AWAY OF DISTRIBUTION CAP, MEDIA, DISTRIBUTION GUIDES, SPRAY BAR CHANNELS, AND SPRAY BARS

U.S. PATENT DOCUMENTS

| | | | |
|---|---|---|---|
| 3,353,802 A | 11/1967 | Greer | |
| 3,788,542 A | 1/1974 | Mee | 239/2 R |
| 3,929,537 A | 12/1975 | Erwin | |
| 3,958,959 A | 5/1976 | Cohen et al. | 55/10 |
| 3,987,845 A | 10/1976 | Potthoff et al. | |
| 3,994,999 A | 11/1976 | Phelps | |
| 4,023,949 A | 5/1977 | Schlom | |
| 4,031,180 A | 6/1977 | Bohanon | 261/106 |
| 4,125,153 A | 11/1978 | Stoneberg | |
| 4,137,058 A | 1/1979 | Schlom | |
| 4,156,351 A | 5/1979 | Schlom et al. | |
| 4,215,079 A | 7/1980 | Christophersen et al. | 261/36 R |
| 4,227,572 A | 10/1980 | Harlan | |
| 4,269,796 A | 5/1981 | Glicksman et al. | |
| 4,300,629 A | 11/1981 | Hatada | |
| 4,310,476 A | 1/1982 | Nahra et al. | 261/118 |
| 4,315,878 A | 2/1982 | Van Dover et al. | |
| 4,350,201 A | 9/1982 | Steineman | |
| 4,361,184 A | 11/1982 | Bengtsson | |
| 4,380,910 A | 4/1983 | Hood | |
| 4,441,557 A | 4/1984 | Zublin | 166/312 |
| 4,499,031 A * | 2/1985 | Sexton et al. | 261/66 |
| 4,554,719 A | 11/1985 | Lewis | |
| 4,681,155 A | 7/1987 | Kredo | |
| 4,752,419 A | 6/1988 | Sperr, Jr. et al. | |
| 4,848,450 A | 7/1989 | Lapkowsky | |
| 4,933,117 A | 6/1990 | Wilson | 261/99 |
| 4,953,831 A | 9/1990 | Albrecht | 261/102 |
| 4,968,457 A | 11/1990 | Welch | |
| 5,072,790 A | 12/1991 | Lapkowsky | |
| 5,130,063 A | 7/1992 | Collins et al. | |
| 5,301,518 A | 4/1994 | Morozov et al. | |
| 5,600,960 A | 2/1997 | Schwedler et al. | |
| 5,606,868 A | 3/1997 | Calvert | 62/315 |
| 5,664,433 A | 9/1997 | Bourne | |
| 5,709,264 A | 1/1998 | Sweeney | |
| 5,775,580 A | 7/1998 | Sizemore et al. | |
| 5,785,117 A | 7/1998 | Grinbergs | |
| 5,832,992 A | 11/1998 | Van Andel | |
| 5,944,094 A | 8/1999 | Kinney, Jr. et al. | |
| 5,966,953 A | 10/1999 | Murr et al. | 62/171 |
| 5,971,370 A | 10/1999 | Galabinski | |
| 6,076,598 A | 6/2000 | Doi et al. | |
| 6,206,348 B1 | 3/2001 | Imsdahl et al. | |
| 6,311,712 B1 | 11/2001 | Meyer | 137/8 |
| 6,338,258 B1 | 1/2002 | Lee et al. | |
| 6,367,277 B1 | 4/2002 | Kinkel | 62/310 |
| 6,378,322 B1 | 4/2002 | Calvert | 62/314 |
| 6,390,122 B1 | 5/2002 | Zhang et al. | |
| 6,591,620 B2 | 7/2003 | Kikuchi et al. | |
| 6,595,235 B1 | 7/2003 | Zhang | 137/270 |
| 6,672,375 B1 | 1/2004 | Shippy | |
| 6,845,629 B1 | 1/2005 | Bourne et al. | |
| 6,854,278 B2 | 2/2005 | Maisotsenko et al. | |
| 6,928,833 B2 | 8/2005 | Watanabe | |
| 6,942,024 B2 | 9/2005 | Nies | |
| 6,966,364 B1 | 11/2005 | Babikian et al. | |
| 7,100,906 B2 * | 9/2006 | Kucera | 261/97 |
| 7,131,639 B2 * | 11/2006 | Kammerzell et al. | 261/96 |
| 2003/0001294 A1 | 1/2003 | Permenter | |

OTHER PUBLICATIONS

2000 ASHRAE Systems and Equipment Handbook—Chapter 43 Heat Exchanger, 2000.

2000 ASHRAE Handbook: HVAC Systems and Equipment—Chapter 44 Air to Air Energy Recovery, 2000.

2000 ASHRAE Handbook: HVAC Systems and Equipment—Chapter 19 Evaporative Air Cooling Equipment, 2000.

Hays Fluid Controls, MeasurFlo Automatic Balancing Valve, Flyer 10000452 Rev 03, 2009.

Premier Industries, Inc. at Houston, Texas: Industrial Evaporative Cooler, www.piec.com, May 12, 2005, pp. 1-4.

www.piec.com: Premier Industrial Evaporative Cooler, Oct. 10, 2006, pp. 1-3.

2003 ASHRAE Handbook: Applications—Chapter 51 Evaporative Cooling Applications, 2003.

* cited by examiner

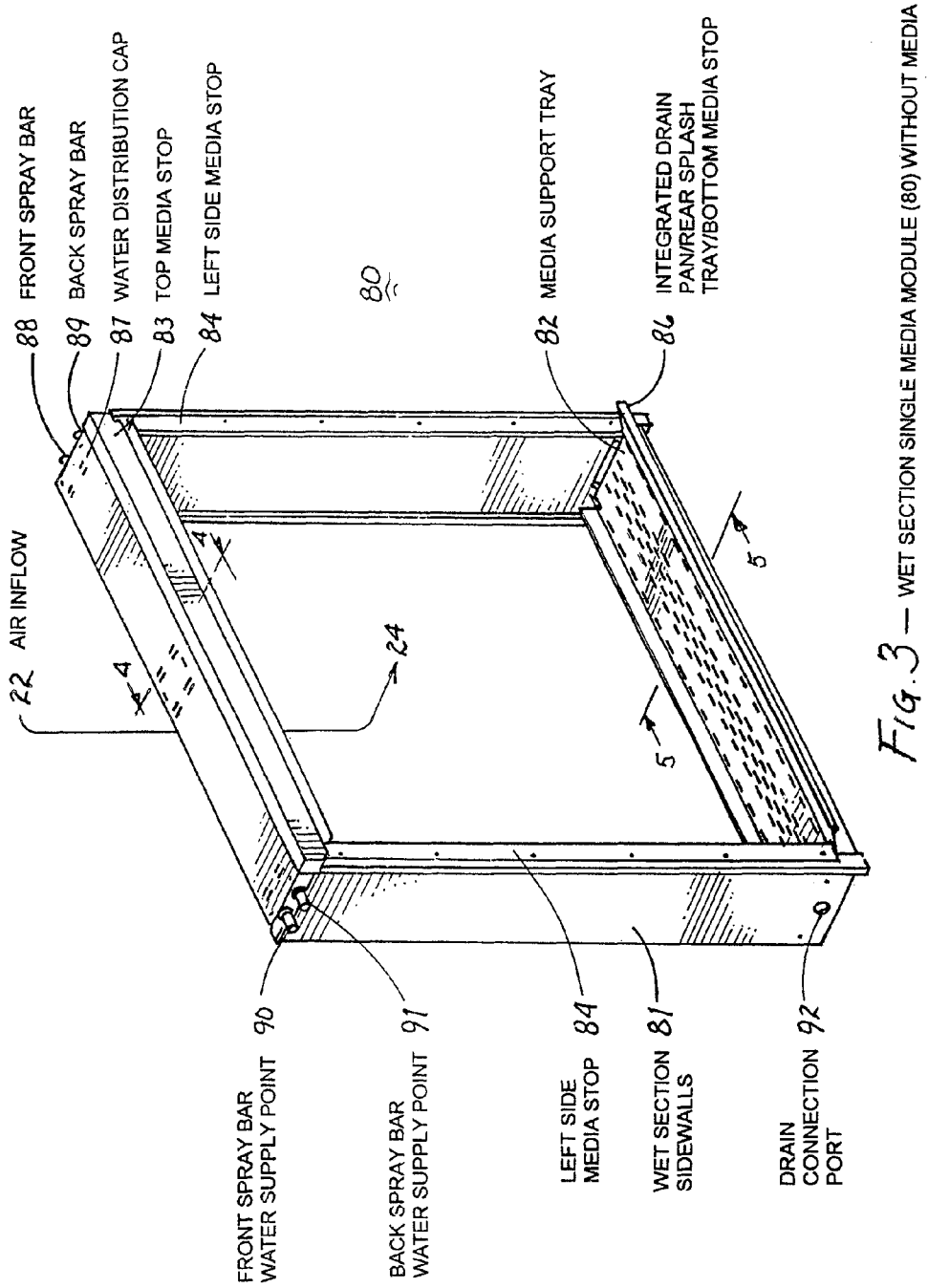
FIG. 3 — WET SECTION SINGLE MEDIA MODULE (80) WITHOUT MEDIA

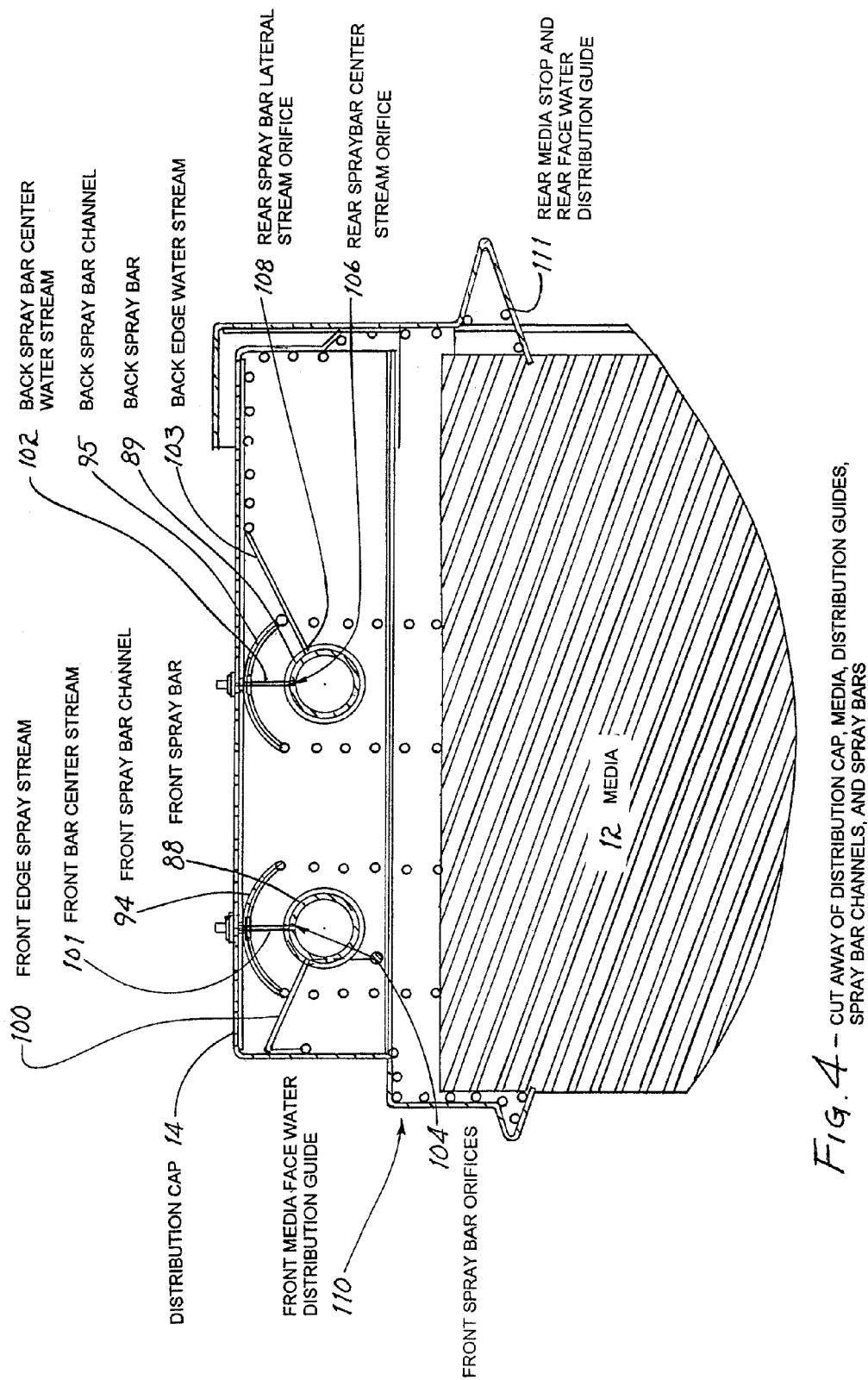

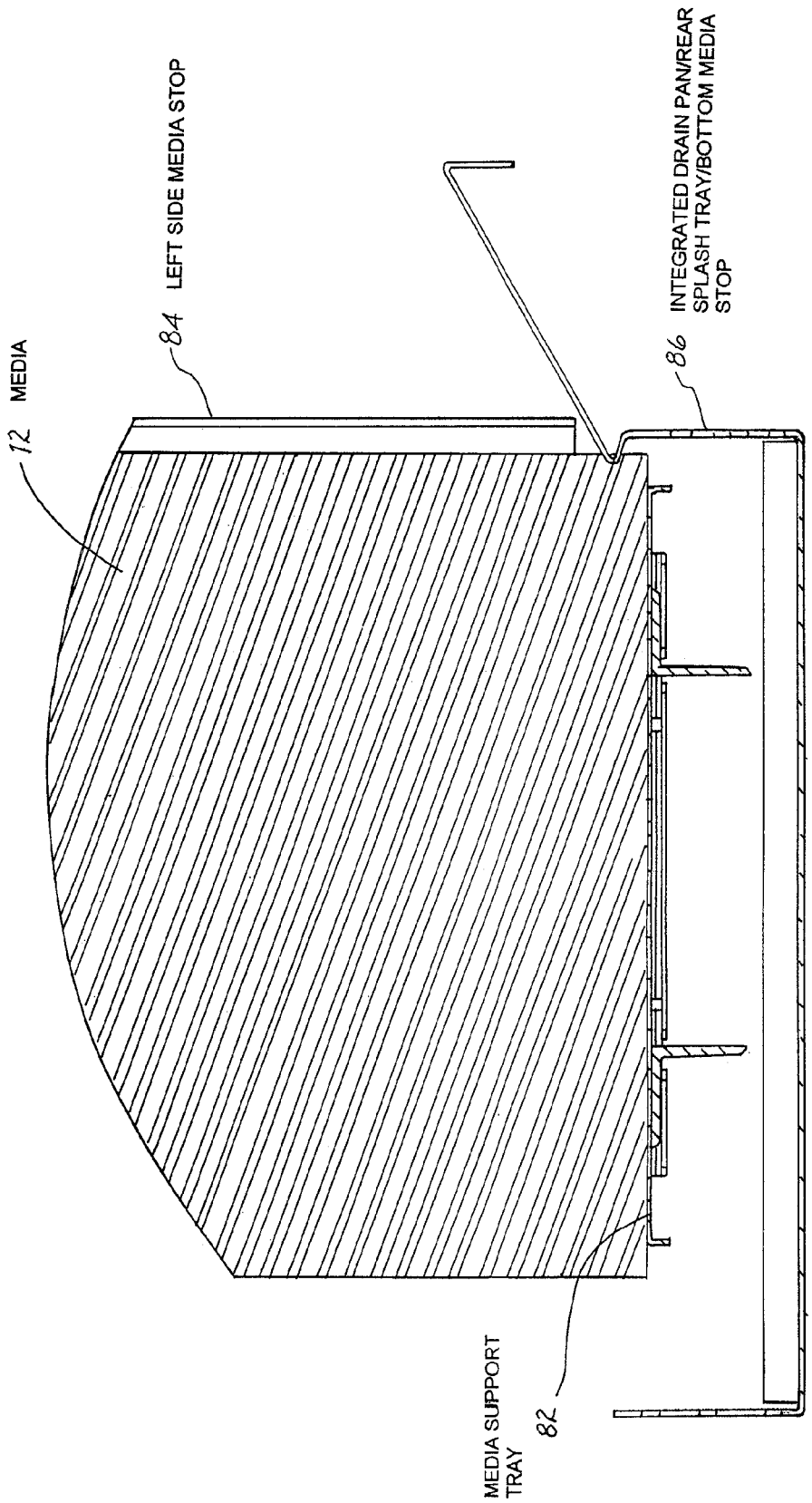

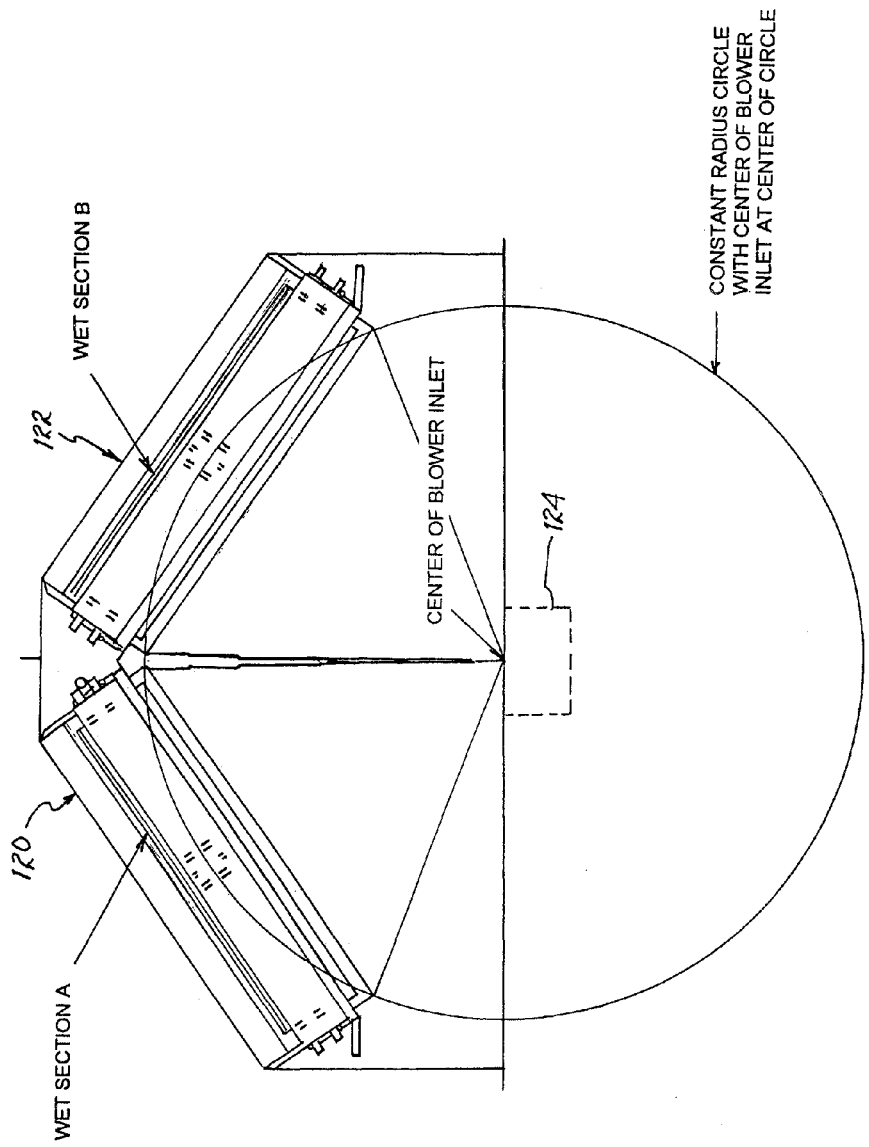

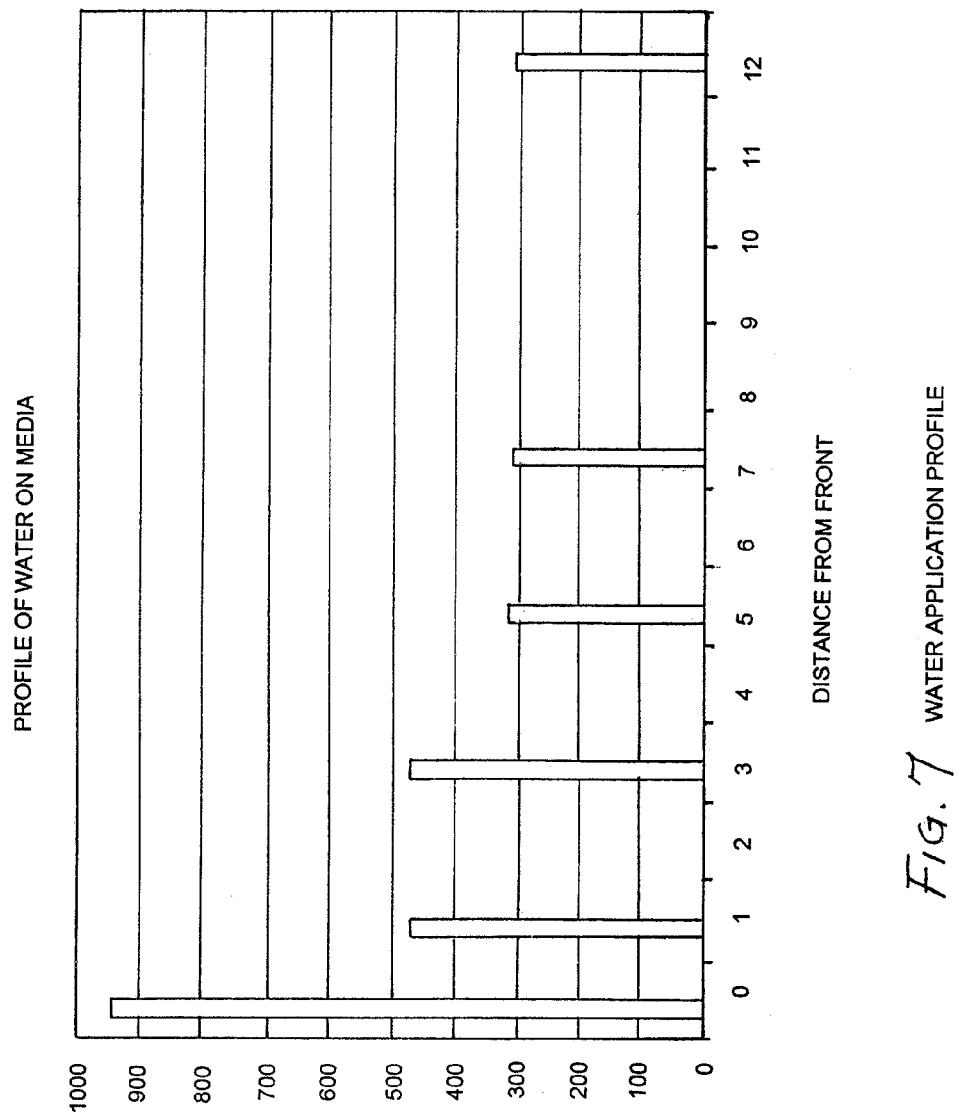
FIG. 7 WATER APPLICATION PROFILE

NON UNIFORM WATER DISTRIBUTION SYSTEM FOR AN EVAPORATIVE COOLER

CROSS REFERENCE TO RELATED APPLICATIONS

This application is a continuation-in-part of an application entitled "Water Distribution System For An Evaporative Cooler", filed Dec. 1, 2006 and assigned Ser. No. 11/569,944, which is a national phase application based on a Patent Cooperation Treaty application entitled "Water Distribution System For An Evaporative Cooler," Ser. No. PCT/US04/43748, filed Dec. 23, 2004, which claims priority to an earlier filed application, entitled "Water Distribution System For An Evaporative Cooler," Ser. No. 10/862,040, filed Jun. 4, 2004, now U.S. Pat. No. 7,131,639.

Moreover, the present application includes subject matter disclosed in and claims priority to a provisional application entitled "Evaporative Cooler With Dual Water Inflow", filed Jan. 18, 2007 and assigned Ser. No. 60/885,557 describing an invention made by the present inventors.

BACKGROUND OF THE INVENTION

1. Field of the Invention

The present invention relates to water distribution systems for evaporative coolers and, more particularly, to a water distribution system for controlling distribution of water in a profile across a media to avoid dry spots, scaling, streaking and application of excess water.

2. Description of Related Art

Evaporative cooling appears to be a simple process of passing hot dry air through a wet pad or media to evaporate the water and cool the air. In reality, there are three complex mechanical and chemical processes taking place in an evaporative cooler. The first process is the air system which is controlled by the psychrometric properties of the air and the efficiency of the media. The second process is the water delivery system that has to ensure that the media has sufficient water in an effective profile for evaporation and that the media is uniformly wetted. The third process is the control of the concentration of minerals in the water where water feed and discharge rates are controlled so that the naturally occurring minerals in the water remain in solution after water evaporation and are disposed of prior to precipitating on the media. Almost all evaporative coolers built to date have made only first order approximations for one or more of the processes and have either ignored or been unaware of the others.

The air around us is essentially a constant composition of gases (nitrogen, oxygen, carbon dioxide and others) and varying amounts of water vapor. It also contains particulate impurities such as dust and organic material, which have little practical impact on the process, unless the unit is in a very dusty environment where special features are needed, therefore no discussion of particulates is included in the following discussion. The gas component of air behaves in accordance with Boyle's and Charles' laws, i.e. the volume of the gas varies inversely with the absolute pressure and directly with the absolute temperature, respectively, and the total pressure is the sum of the partial pressures. The amount of moisture in the air is dependant on the amount of moisture available and the temperature and barometric pressure of the air. This is limited to a maximum saturation value based on the air temperature and pressure and the psychrometric behavior of water vapor. As moisture is added to or removed from the air, water is either evaporated or condensed. This change in phase captures or releases energy. In evaporative cooling applications, the evaporation of water absorbs heat. The movement of the heat from the air to the water vapor happens without a change in air volume or air pressure and results in a lowering of the temperature of the air. The relationships between pressure, temperature, humidity, density and heat content are most commonly shown graphically on psychrometric charts. These relationships are very well defined and have been the subject of extensive research. Applying the psychrometric chart to the evaporative cooling process is easy for any one particular set of operating conditions. If one knows the entering air temperature (inlet dry bulb), the relative humidity of the inlet air, the barometric pressure and the volume of air being cooled one can calculate the theoretical amount of moisture that can be evaporated into the airstream and the resulting temperature reduction.

Actual operating conditions change constantly. The inlet air temperature, the relative humidity and barometric pressure are the detailed measurements of what is generally referred to as the "Weather". Most evaporative cooler manufacturers design their equipment to handle a specific air flow rate at standard conditions and size the evaporation media for this flow rate. The efficiency of the evaporative cooler is determined by the air flow rate over the chosen media. Each media type has physical characteristics that determine how fast and thoroughly the water can be evaporated into the airstream. The most common evaporative cooling media in use today is a corrugated kraft type paper. The market leader in this type of media is Munters Corp. which markets its media under the brand names Cel Dek and Glacier-Cor. Depending on the thickness of the media used and the velocity of the air flowing through the media, the saturation effectiveness (efficiency) can range from less than 60% to about 98 or 99%.

The majority of existing evaporative coolers are controlled by an on/off switch or with a downstream thermostat which turns the evaporative coolers either on or off. The efficiency of the evaporative cooler changes with the barometric pressure, the partial pressure of the water vapor and the air temperature with the impact of these being magnified by the physical condition of the cooler. The conventional evaporative cooler does not attempt to account for or control any of these process variables to optimize efficiency and account for such variation in environmental conditions.

To obtain maximum evaporation, the media must be adequately wetted. Most conventional evaporative coolers have a large basin or sump filled with water that is pumped to a perforated header pipe at the top of the media. The water is sprayed from the header pipe up to a deflector shield and runs down onto the top of the media. Excess water is applied to ensure adequate distribution and complete saturation of the media. The water not evaporated drains into the sump to be reused. All recirculating evaporative cooler manufacturers recommend that a portion of the recirculating water be discarded and replaced with fresh water added to the sump to keep the water quality at a minimum quality level.

The media removes significant amounts of airborne contaminants from the air as it passes through the media and the return water rinses a portion of the contaminants off the media and carries them to the sump. In addition, naturally occurring salts in the water supply become concentrated on the surface of the media and are partially rinsed into the sump. While some of these contaminants and concentrated minerals are discharged in the bleed stream, a significant amount are entrained in the sump water and are recirculated back onto the media.

The pumps used in most recirculating type evaporative coolers are submersible centrifugal pumps. These inexpensive pumps are not precision pieces of equipment and wear quickly as the debris is recirculated. This deterioration of the pump leads to fairly rapid changes in the delivery head for the pump. This change in the output of the pump renders it difficult to regulate the water flow across the media. The distribution header pipe uses large holes on relatively large hole spacing to minimize debris fouling and plugging. The end result is an uneven water distribution and occasionally dry strips on the media. Constant maintenance is required to adjust and maintain an adequate supply of water for the media. These systems attempt to cure uneven water flow by pumping an excess amount of water to the media. This excess amount of water occupies space in the air flutes of the media which reduces airflow and increases the velocity in the air passage increasing the potential for water entrainment and carryover.

The most overlooked aspect of evaporative cooling is controlling the concentration of dissolved minerals as water is evaporated on the media. The water supply for evaporative coolers is typically domestic water which contains a number of compounds. Of these silicon and calcium carbonate are the more important from an evaporative cooler performance perspective. As water is evaporated by the air passing through the media, it leaves behind all of the minerals in a reduced volume of water flowing down the media. Each mineral compound has a solubility limit. That is, when the concentration of a particular compound reaches a known concentration, the compound begins to precipitate. In evaporative coolers the most predominant form of precipitate is calcium carbonate scale on the media. This hard water scale does not re-dissolve when rewetted. Once formed on the media it forms an insulating layer reducing the saturation efficiency and clogs the air and water distribution channels.

Recirculating evaporative coolers reapply the sump water to the media. Each time the water is applied, some of it evaporates and the concentration of the minerals builds up in the water. All evaporative cooler manufacturers either bleed some of the recirculating water off or dump the sump water occasionally to try to maintain an acceptable mineral concentration (called cycles of concentration in the industry). In simple terms, cycles of concentration, in a non feed and bleed situation, is the ratio of the ending volume of water to the initial volume of water. In a feed and bleed situation it is an exponential function of system volume, rate of feed and bleed, and duration of feed and bleed. For example, in a once through system where ten (10) gallons of water enters the media and nine (9) gallons are evaporated leaving one (1) gallon to exit, the media the cycles of concentration would be ten (10) divided by one (1) or ten (10) cycles of concentration. Most sumps have a float actuated make up valve to add water to the sump. This mixes the fresh water with the concentrated minerals to reduce the concentration. As a practical matter, however, some of this fresh water is also discharged such that the resulting water being distributed on the media will always have higher levels of dissolved minerals than the inlet water.

If the water distribution system allows the water in any area to become too concentrated with dissolved minerals before it leaves the media, the media will start to scale. Once scaling begins, the process threshold for additional scaling is reduced such that the salt crystals will grow whenever the water surrounding them is near the precipitation point. This occurs after scaling starts and the recirculating water must be kept at a lower dissolved solids concentration than would be allowed if the scale had not started.

To date, the best solution for improving cooler performance and control of media scaling is that of eliminating a recirculating system in favor of a single water pass system.

The single pass systems provide water to the top of the media and let it flow through the media and the flow therefrom is drained. There are several challenges that must be addressed to have an effective single pass system. First, one must incorporate sensors and controls to regulate the water introduced to the media. Second, the flow volume of water must be sufficient to wet the media completely and yet the flow must be limited so as to avoid wasting large amounts of water. Some existing systems use a timer based controller to achieve the water flow control. Another type of system uses an inlet temperature sensor or a sensor within the media coupled with a timer to control the flow of water. These systems have the significant disadvantage of using too much water or from using an insufficient amount of water resulting in drying out and scaling of the media. These limitations have limited their commercial acceptability.

Various prior art evaporative cooler systems are described in the patents listed below.

U.S. Pat. No. 4,968,457 describes a non circulating control for an evaporative cooler. The water flow is metered by a simple solenoid valve which does not take into consideration change in flow rate as a function of inlet line pressure. Therefore, the amount of water delivered at different times of the day will vary with changes in domestic water line pressure. Furthermore, there is no understanding of the need for a change of water flow rates as a function of the hardness of the inlet water nor is there a discussion of providing more water than is evaporated to keep the media from scaling. A sensor for controlling operation of a solenoid valve is placed downstream of spray nozzles ejecting water to the media to sense the temperature or the humidity. There is no understanding that the cooling process is primarily dependant on the inlet air conditions.

U.S. Pat. No. 5,775,580 is directed to a non circulating evaporative cooler for primarily eliminating the dripping of water from the media. This will result in at least a part of the media becoming dry with resulting deposit of salts and compromise of the integrity of the media and its effectiveness unless pure water is used.

U.S. Pat. No. 6,367,277 discloses the use of fresh water makeup to minimize scaling in a recirculating evaporative cooler system. There is no disclosure relating to controlling the hardness of the water at the point of evaporation on the media nor does this system minimize the amount of water used. It also requires bleed of a substantial amount of the recirculating water to keep the minerals from precipitating out. No understanding of the varying conditions from location to location and the effect thereof on the efficiency of the evaporative cooler is set forth.

There are several types of problems associated with heavy scale formation on the media in an evaporative cooler where evaporative cooling occurs. First, there is a decreased air flow through the media because the air channels therewithin become more or less plugged. To maintain an adequate air volume, the velocity of the air through the media must increase. At speeds above 650 feet per minute, there is a tendency for small droplets of water to become entrained in the airstream unless other steps are taken. These droplets create corrosion and other wetting problems unacceptable to the user. Second, at localized concentrations of salts, the pH in those areas decreases dramatically. The lower pH will allow the water to leach the resin and delignify the cellulose in the media and cause premature structural failure of the media.

Indoor air quality has become a growing concern as modern office and industrial buildings become more energy efficient and better insulated. Various regulations cover how much fresh outside air must be introduced into the HVAC system in a building. This outside air is rarely at the desired temperature and relative humidity. In the southwest of the United States, the air is generally much dryer and hotter then desired. This means that the makeup air requires cooling and humidification before it can be introduced into the building. Conventional chilled water systems in large commercial buildings use large cooling towers and chillers to supply the cooling for the building. These systems are usually on or off and when on use considerable electricity to operate. Direct evaporative cooling has been used to reduce this electrical demand by evaporatively cooling the makeup air prior to use. These applications have been plagued by the same scaling and lack of control problems described above.

Evaporative cooling is often used in dusty industrial environments. Historically, recirculating evaporative coolers become plugged with dust. Often pre-filters are installed upstream of the evaporative cooler to remove the dust present in the air. Poor maintenance often resulted in filter overloading, filter failure and media plugging. One approach to this problem of dust has been that of using an excess water flow controlled by only a timer for dust control.

These results were not particularly successful. A further unit uses a fresh water makeup header to try to control the dust buildup but a timer is used to activate the flush and it has not proved to be effective.

SUMMARY OF THE INVENTION

The evaporative cooler is a unique arrangement of a combination of specially selected fluid components that includes flow control valves, spray bars, spray bar orifices, spray bar distribution channels, media front and rear distribution plates, and distribution caps yielding a configuration that produces a water application profile that is adjusted to match the heat load introduced to the media by the air to be evaporatively cooled. The water evaporation rate is a direct function of this heat load profile. Applying water in this profile is achieved by a water distribution system configured to account for the wicking rate, capacity of media to retain water, flow through time constant of evaporative cooling media, flow through characteristics of media with various flute angles, air velocity impact on water flow through the media, and the air psychrometric properties and flow rate. This results in a once through system where the volume of water being applied is consistent with that needed to account for evaporation and bleed to achieve very high cycles of concentration while maintaining high levels of cooling effectiveness and scale free pads.

A primary object of the present invention is to provide an evaporative cooler to achieve an effective water distribution for a once through water metering system using the latest electronic and mechanical equipment and fabrication capabilities to obtain effective cooling with little water used beyond that evaporated to cool the air.

Another object of the present invention is to provide an evaporative cooler with the ability to cool effectively while limiting the volume of water used by distributing water onto evaporative cooling media in a profile that matches the thermal profile and water evaporation rate of the air to be evaporatively cooled as it travels from the front to the back of the media.

Still another object of the present invention is to provide an evaporative cooler that distributes water onto evaporative cooling media in a profile that results in very little or no mineral buildup and scale formation to achieve maximum cooling performance and extension of the media life.

Yet another object of the present invention is to provide an evaporative cooler that distributes water onto evaporative cooling media in a profile that results in significantly high cycles of concentration of water exiting the media, achieved reduced water bleed or discharge requirements and reduced the water withdrawn and used by the evaporative cooler.

A further object of the present invention is to provide an evaporative cooler that distributes water onto evaporative cooling media in a profile to obtain longer media life by wetting the media effectively to reduce scale, to reduce the water passing over the media and to prevent wash out of regifying agents.

A still further object of the present invention is to provide a water distribution system for delivering a tailored flow rate of water that matches the media heat load profiles and corresponds with media design and performance characteristics.

A still further object of the present invention is to provide a water flow rate for an evaporative cooler which is developed and delivered by the selection of specific flow control valves, and design of spray bars, associated spray bar channels and distribution cap.

A yet further object of the present invention is to provide the ability to generate a consistent water distribution pattern from end to end of the media accounting for orifice size and orientation and the ability to produce consistent water jets that achieve a height sufficient to reach a spray bar channel and distribute the water uniformly along their length and across the depth of the media.

A yet further object of the present invention is to provide a water flow rate along the length and across the media depth of an evaporative cooler with spray bar channels configured to accept the water from spray bar jets and redistribute this water evenly at each edge of the spray bar channel.

A yet further object of the present invention is to provide spray bar channels located above the media of an evaporative cooler and formed with a radius that is sized to apply water at desired locations along the depth of the media.

A yet further object of the present invention is to provide a distribution cap that is configured to accept the water from spray bar jets directed to the front and back of the cap and redistribute this water to the very front and very back surfaces of the media of an evaporative cooler.

A yet further object of the present invention is to provide a water distribution system for an evaporative cooler which includes a distribution cap that incorporates features to orient and securely configure the spray bars and spray bar channels to consistently apply water in a designated profile to each media module of an evaporative cooler to uniformly wet and maintain the media wet.

A yet further object of the present invention is to provide a distribution cap for the front and rear media faces in an evaporative cooler to distribute water delivered by spray bar jets directed to this cap uniformly to the media faces to avoid water collection and droplet formation leading to water entrainment issues.

A yet further object of the present invention is to provide a method for achieving an effective water distribution for a once through water metering system using the latest electronic apparatus, mechanical equipment and fabrication capabilities to obtain effective cooling with little water used beyond that evaporated to cool the air.

These and other objects of the present invention will become apparent to those skilled in the art as the description thereon proceeds.

BRIEF DESCRIPTION OF THE DRAWINGS

The present invention will be described with greater specificity and clarity with reference to the following drawings, in which:

FIG. 3 is an isometric view of a wet section single media module without media showing the structure surrounding the media;

FIG. 4 is a partial cross sectional view taken along lines 4-4 shown in FIG. 3 and showing the distribution cap, media face distribution guides, spray bars and spray bar channels;

FIG. 5 is a cross sectional view taken along lines 5-5 shown in FIG. 3 and showing the left side media stop, integrated drain pan/rear splash tray/bottom media stop, media support tray, and media;

FIG. 6 is a plan view of a cooler using two wet sections oriented with their centerlines falling on an arc of constant radius from the center of the blower inlet; and FIG. 7 is a profile of water versus distance from the front to the back of the media and showing the relative volume of water applied to specific locations on the media.

DESCRIPTION OF THE PREFERRED EMBODIMENT

Figure 1:
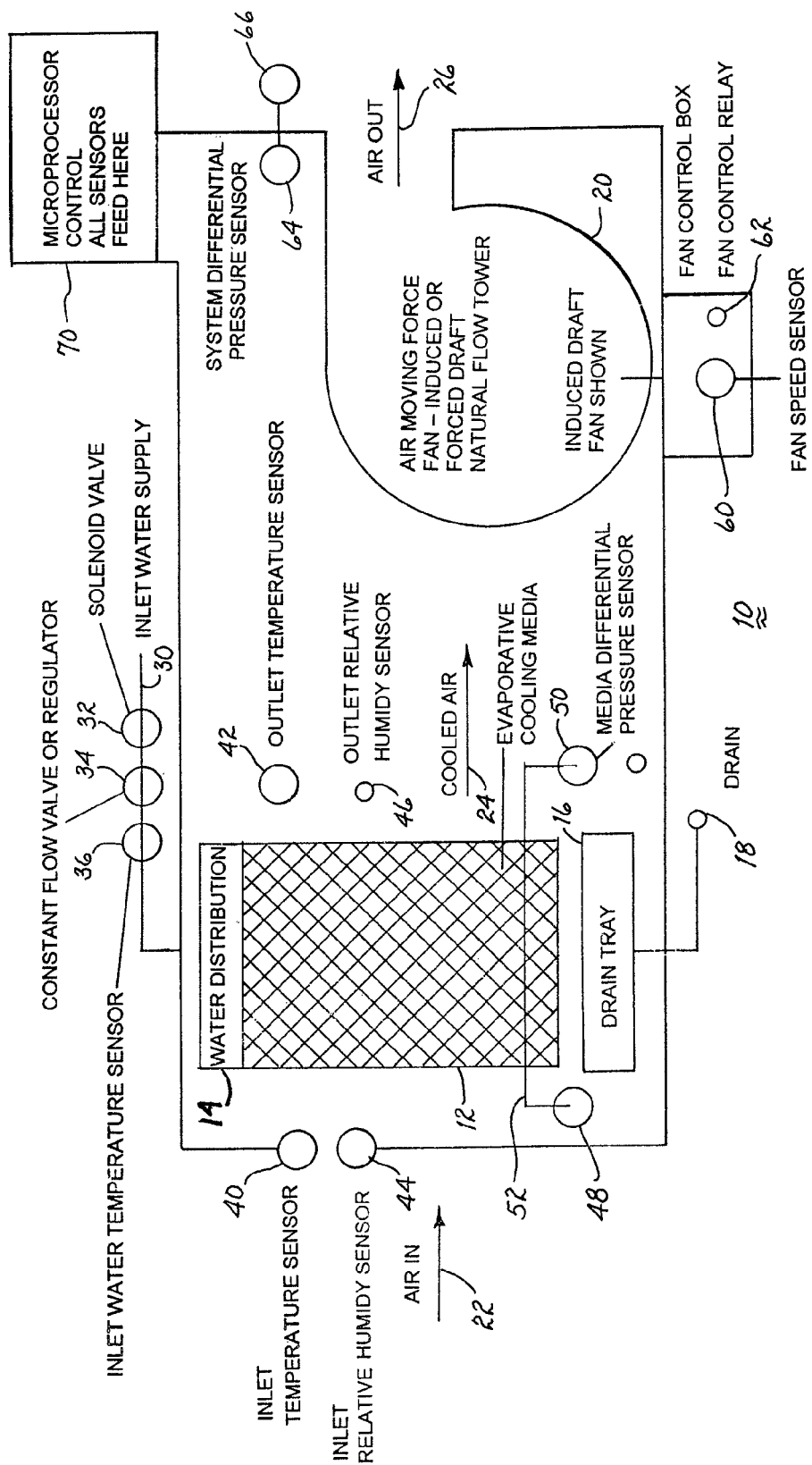
FIG. 1 is a schematic illustrating an evaporative cooler embodying the present invention.

The psychrometric chart provides information such that knowing the inlet dry bulb temperature, the inlet wet bulb temperature, altitude, and volumetric flow rate of the air one can determine the amount of moisture that can be added to this air and the resulting leaving air dry bulb and wet bulb temperatures. The chart in effect uses thermal and mass balance equations and algorithms to yield this information. For an evaporative cooler, the mass balance and associated psychrometric equations are solved using the inlet conditions and the capabilities of the equipment. The evaporation rate is dependent on the difference between the local conditions which vary along the depth of the media and the wet bulb temperature. Existing once through evaporative coolers attempt to measure and control water application using the inlet temperature, the pad or media temperature, the outlet temperature and relative humidity or pad/media relative humidity, but fail to do so with algorithms correlated to psychrometric physical behaviors of the pad/media and the condition of the inlet or local air. It is known that the physical state of the inlet air is responsible for all efforts to achieve evaporative cooling. At one extreme, if the inlet air is at 100% relative humidity, the evaporative cooler cannot function because additional moisture cannot be added to the air and hence no reduction in temperature of the outlet air can be achieved. Yet, there are an infinite number of possibilities of inlet conditions and operating parameters that could yield this measured outlet condition.

Measuring the full set of inlet conditions and having an effective algorithm that accounts for the influence of each of these key parameters, the characteristics of the wet section design and characteristics of the media, permits calculation of the expected performance of the cooler and water evaporation rate. The problems that have been most limiting in applying these concepts to evaporative coolers are the lack of a comprehensive algorithm that accounts for the impact of each of these factors, the lack of understanding of the need for and methods to produce a water application profile through the media and finally the inability to control the rate of water addition and distribution of this water effectively at low water to air flow ratios. Recirculating coolers attempt to compensate for the limitations by incorporating a higher water to air flow ratio, delivering the additional water to the top of the pad and then collecting and returning this water through a recirculating loop.

Those familiar with cooling tower design will recognize the implications of liquid to gas ratio, approach temperature and media surface area on system performance and component design. In particular, to achieve a close approach temperature with less media surface requires a lower liquid to gas ratio. Lowering the liquid to gas ratio requires additional attention to the design of the water distribution system and is usually considered a much more difficult design to achieve. The objective in a cooling tower is to cool a body of water for various uses while the objective of an evaporative cooler is to cool a body of air for discharge into a building with both using the behavior of water evaporation to accomplish the cooling. In this regard, both gain advantage in achieving a lower water to air ratio that produces a thin water film with high air contact area. The extreme of this for an evaporative cooler is water saturated media in concert with little or no water flow and high air contact with the naturally rough media surface.

A unique feature of the media that supports design of a water metering system is the water storage capacity of the media itself. In particular, the media is able to absorb and store a quantity of water equal to or greater than its own weight. This storage capacity means that the media can be operated for a finite period of time with air flowing through it evaporating water to cool the air without the need to have water flowing onto it. This can continue for a substantial period of time with the cycles of concentration of the water in the media remaining at acceptable levels. To take advantage of this feature, water is applied in bursts that alternatively wet and rinse the media and drawing water out of the media during the off time to cool the air. To effectively wet the media during the on cycle, one must account for the physical behavior of the media. In particular, one must account for the time that it takes for water to travel from the top of the media to the bottom of the media (the time to travel from top to bottom of a six (6) foot piece of media is about eighteen (18) seconds) is termed here as the media time constant. This time period is important since applying water longer than this time period most likely means that water will be flowing out of media channels that have been saturated at a rate that it is close to that being introduced. An additional physical behavior that is important is the distance that water wicks during the time that it takes for water to travel from top to bottom since this will influence the design of the water application separation distances (termed here as the wicking time constant which is about one inch (1") in eighteen (18) seconds). Influencing and complicating these behaviors along the length of the media are the physical design characteristics of the media influencing the flow of water down and along the depth of the media (flute angles), the velocity and uniformity of air flow velocity across the media, and the variation of evaporation rate across the depth of the media (heat load profile).

Given these design characteristics and physical behaviors of the media, the first challenge attendant metered water evaporative cooler design is to determine the limit for how much water can be evaporated from saturated media before the water remaining reaches the limiting cycles of concentration (dependent on local water conditions) but for typical water in Phoenix, Ariz. this limit is one half of this water. Once this limit is identified, one needs to determine how long saturated media can be operated without adding water over the full range of input conditions (impacting water evaporation rate) before this limit is reached.

Those skilled in the art of evaporative cooler design will understand both the significance of the design features and parameters used in the preferred embodiment as they are deployed to achieve optimum performance with regard to cooling, media life, and water conservation using twelve inch (12") 45/15 media. There are, of course, a broad range of parameters outside the values described in this preferred embodiment that can be deployed to implement the metered water application features and derive significant benefits but with greater water consumption. Additionally, the specific features and parameters implemented are a function of the depth and flute angles of selected media. In this regard, the descriptive material presented in the preferred embodiment section is not meant in any way to bound or otherwise limit the embodiment to an approach or set of parameters but is presented only as a way of communicating the critical attributes of the invention.

A key challenge attendant the water distribution systems of existing evaporative coolers relates to non uniform distribution of water upon the media. That is, the distribution of water along a spray bar or the like is generally in a diminishing volume from the inlet end to the closed end of the spray bar. Furthermore, the volumetric flow rate of discharge along the spray bar is generally a function of the size of the orifices in the spray bar and variations in pressure of the inflowing water from a municipal water system or other water source; it is well known that such pressure in city potable water systems varies during any given 24 hour period. It has been learned that by controlling the area of the spray bar orifices to less than twenty five percent (25%) of the inlet flow area (flow can be introduced from both ends) the dynamic head can be held to a small fraction of the static head and produce little variation in static pressure from one end of the bar to the other such that a uniform discharge form the orifices is achieved. For example, the spray bars shown in FIGS. 3 and 4 provide such a uniform volumetric discharge from each of the orifices extending from the inlet end to the closed end, which does not exceed +/−10% variation along the spray bar. With such uniformity of water discharge, the water distribution in the media is within a four percent (4%) tolerance.

When multiple media modules are used, the tolerance or variation between wetted media does not vary more than five percent (5%). To achieve these results, orifices are formed with a tolerance of +/_2.4% uniformly spaced along the spray bar. Furthermore, the total area of the orifices is established as less that twenty five percent (25%) of the internal cross sectional flow area of the spray bar (having water enter from both ends of the spray bar allows this condition to be met where greater orifice area is needed). Additionally, the total area of orifices is less than that calculated using D'Arcy formula to yield a resultant spray bar pressure greater than one (1) to five (5) psi when the rate of flow is controlled to that of the desired media wetting rate. For a spray bar having a one inch (1") inside diameter, each orifice would be sized to have a diameter of fifty thousandths of an inch (0.050"); depending on certain variations, the diameter may be in the range of about 0.040" to about 0.050". These dimensions meet the criteria of the apertures collectively having an area no greater than twenty five percent (25%) of the internal cross sectional area of the spray bar.

If the water distribution is not uniform along the length of the media and in a profile across the depth of the media that matches the heat load and water evaporation rate, or if the water application rate is insufficient, there will be dry spots on the media or excess water discharge. At each such spot, any dissolved minerals in the water will collect and build up. Subsequent wetting will not redissolve the solids and the efficiency of the media will be compromised.

Regarding inlet parameter measurement and control, the only input parameters attendant most evaporative coolers include a leaving air temperature switch (such as a room thermostat), the area of the wetted media and the nominal air flow. For example, a commercially available unit simply measures the temperature of the out flowing air while another unit measures the inlet air temperature and regulates the on and off time of the water supply as a limited set of defined control points.

Referring to FIG. 1, there is shown an evaporative cooler system 10 and the control for operating it efficiently while causing minimal deterioration of the operative aspects of the wetted media. The most common media 12 presently in use is of the corrugated Kraft type paper. A typical form of this media is manufactured by Munters Corp. and sold under the Cel Dek and Glacier-Cor trademarks. While alternate configurations can be accommodated, the preferred embodiment is designed to accommodate the most common form of this media which is having the Munters patented flute having angles of forty five degrees (45°) oriented downward to the front to influence water flow toward the air stream, and fifteen degrees (15°) oriented downward to the back to provide a low pressure drop path for the air flow. A water distribution unit 14 mounted above the media is designed to uniformly distribute water along the width and in a profile matching the heat load across the depth of the media at a sufficient flow rate to effectively wet the media but at a rate low enough to limit the water exiting the media during the wetting cycle to that needed to match the desired water discharge cycles of concentration. Water dripping from the media is collected in drain tray 16 and discarded through a drain 18. The wet section with its associated parts and features and particularly distribution unit 14, media 12 and drain tray 15 is discussed below.

This wet section consists of the water distribution equipment and the components that surround the media. The water is not re-circulated; thereby, the build up of dissolved minerals and solids in the water experienced in recirculating evaporative coolers is eliminated. Air to be cooled, as represented by arrow 22, is drawn through media 12 by a fan 20. It is to be understood that any of various air moving devices may be employed to cause air flow through the media. As the air passes through the media, it causes evaporation of some of the water present on the media. Such evaporation draws heat from the air and the cooled air is exhausted from the media, as represented by arrow 24. This cooled air is drawn into the fan and then discharged, as represented by arrow 26, into the environment to be cooled. An inlet water supply 30 may be either purified water, water from a municipal water system or other source of water. This broad range of water quality is accounted for by determining the scaling index parameters and entering the appropriate cycles of concentration into the controller for use in the water metering algorithm. A solenoid valve or motor operated ball valve 32 in concert with the flow control valves controls the quantity of water metered into evaporative control system 10 and ensures that water inflow only occurs during operation of the system; various shut off controls may be incorporated to ensure cessation of water flow in the event of malfunction of one or another component.

The flow rate of water entering the system when the solenoid valve is open is controlled by a constant flow control valves 34. These valves ensure that a predetermined flow rate of water is distributed to water distribution unit 14 irrespective of the input pressure fluctuations that normally occur with respect to any municipal water system as a function of changing demands. A temperature sensor 36 to sense the temperature of the water flowing to media 12 via water distribution unit 14 is embodied. Since the temperature of the inlet water has a limited effect on the cooler operation and performance, this instrument need not be present for effective cooler operation.

It is well known that evaporation is a function of a number of variables which must be sensed and appropriate response actions taken to ensure that no dry spots exist or come into being on the media. To achieve this end, numerous sensors are employed. As shown in FIG. 1, sensor 40 senses the temperature of the air flowing into media 12 and sensor 42 senses the temperature of the air flowing from the media. Sensor 44 senses the relative humidity of the air flowing into the media and sensor 46 senses the relative humidity of the air flowing from the media. Sensor 48 senses the pressure upstream of media 12 and sensor 50 senses the pressure downstream from the media and thereby a differential pressure can be determined, as representatively illustrated by line 52.

The rate of air flow through media 12 may be varied in response to varying climatological conditions to ensure highest efficiency of evaporative cooler system 10 and the greatest temperature differential between the air flowing into and out of the media. In general, the efficiency of the media increases as the velocity or volume flow rate through the media is decreased with the efficiency being approximately 90% at 500 feet per minute. To permit varying the rate of air flow generated by fan 20 and account for this variation in metering the water onto the media via the control system, a sensor 60 is used to sense the speed of the fan and a relay 62 may be used to control operation of the fan. Similarly, a pressure sensor 64 within the evaporative cooler unit senses the pressure therein and in combination with sensor 66 sensing the pressure of the environment into which the cooled air is discharged provide an indication of the differential pressure.

The above described sensors are interconnected with a microprocessor 70 that receives electrical signals from the sensors. Upon processing the data represented by each of these electrical signals, an algorithm continuously computes and sends signals to control the off time of solenoid valve 32 which effectively governs the quantity of water delivered to distribution unit 14 during the complete on/off cycle. Similarly, the speed of fan 20 may be controlled to provide an air flow rate through media 12 that will optimize operation of the evaporative cooler.

Figure 2:
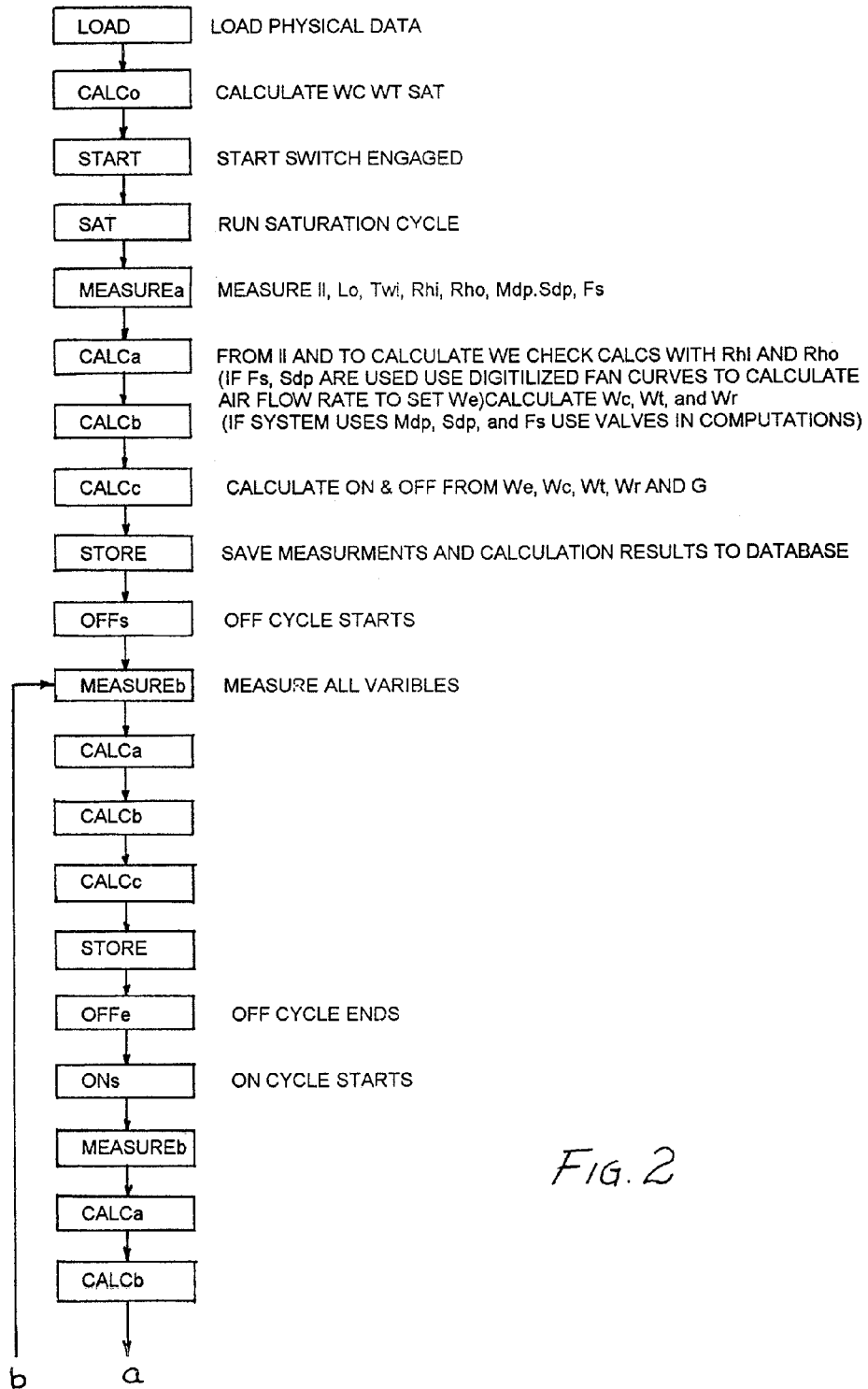
FIG. 2 is a flow chart of the functions performed by a microprocessor controlling operation of the evaporative cooler.
Figure 2A:
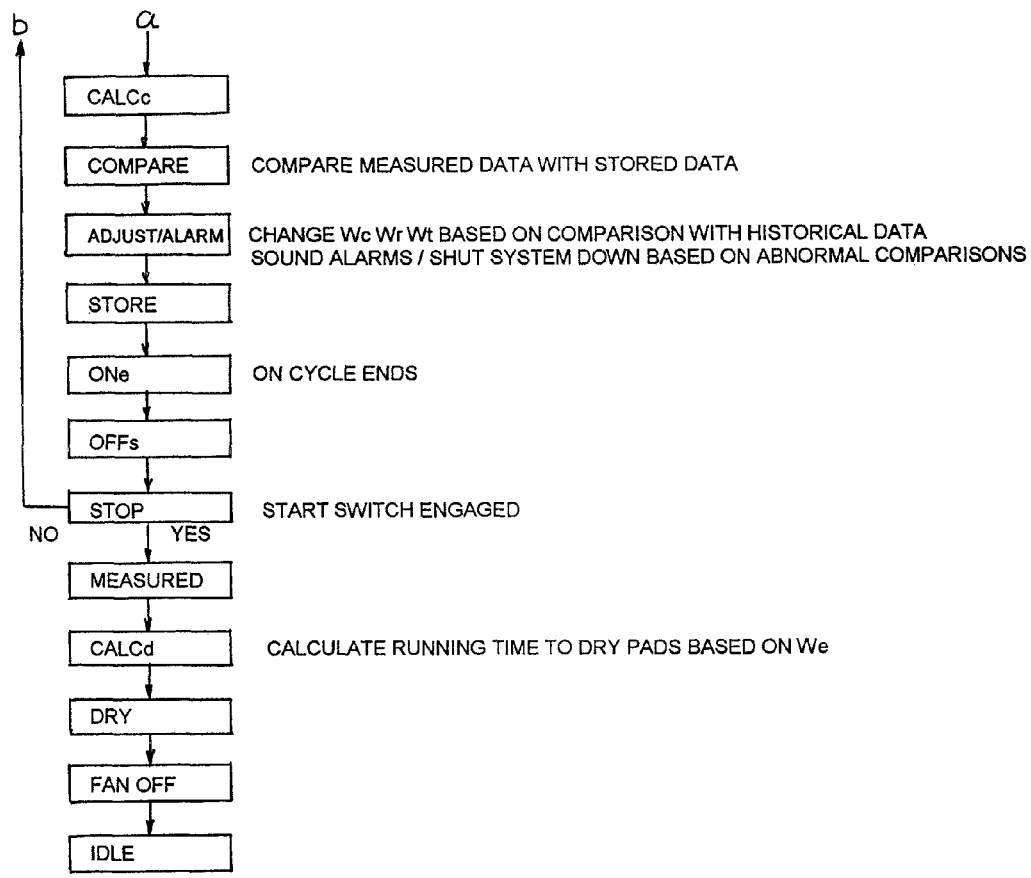
FIG. 2A is a legend for the acronyms set forth in FIG. 2.

Referring to FIG. 2, there is shown a flow chart representing the operation of microprocessor 70 along with a legend for the terms in the flow chart. As this flow chart is self explanatory, it need not be paraphrased herein.

Referring to FIG. 3, the structure and operation of a single media module 80 will be described. A structure consisting of wet section side walls 81, media support tray 82, and water distribution cap 87 surround the media (not shown) to fix the media in place while air barrier consisting of top media stop 83, left side media stop 84, right side media stop 85 and bottom media stop (tray) 82 ensure that the air inflow, as represented by arrow 22 (FIG. 1), is through the front side of the media and that the out flowing cooled air, as represented by arrow 24, is through back side of the media. Since the efficiency of the media is a strong function of the air velocity through the media, the media should be aligned at a close to a constant radius distance to the center of the fan inlet as possible or the variation of velocity across the media will cause a variation of performance leading to unequal evaporation and both performance degradation and excessive water use or scaling. This is achieved by arranging the media wet sections such that their centerline coincident with a constant radius to the center of the fan inlet, as shown in FIG. 6. An integrated drain pan 86 in FIG. 3 is mounted at the bottom of wet section media module 80 to receive the water that will drip from media 12. The water collected in the drain tray is discharged through drain connection port 92.

As particularly shown in FIGS. 3 and 4, water, from a source of water, is introduced through a pipe 90 and conveyed to front spray bar 88 and back spray bar 89. Water jets from the front spray bar are directed upwardly in a center water stream that strikes front spray bar channel 94, as represented by water stream 101 and forwardly in a water stream 100 that strikes the front of water distribution cap 14. The spray bar channel is in the nature of an inverted trough mounted in water distribution unit 14. The role of each spray bar channel is to transform the water streams exiting the spray bar from a single row of orifices to a dual row of equal water streams. The water striking the spray bar channel flows downwardly along the opposed interior sides of the spray bar channel with capillary action holding the water to the inside surface of the spray bar channel to enter the media at locations determined by the shape and position of the spray bar channels relative to the position of the media. The water stream 100 from spray bar 88 strikes the front surface of the distribution cap and runs down front distribution guide 110 to direct the water to the front edge of the media. Similarly, water stream 102 from back spray bar 89 distributes water to the back spray bar channel 95 and back edge water stream 103 strikes the rear of the distribution cap which directs the water to the rear distribution guide. The front and rear distribution guides, extend into media 12 and assure the front and rear, respectively, of the media stay wet. The shape of distribution guides 110, 111 is designed to achieve a high level of stiffness such that continuous contact is achieved and shaped to avoid water being pulled away from the media and splash on the floor outside the drain pan or be drawn away from the media and entrained in the discharge air stream.

Having determined the media performance limits one turns to the challenges impacting the design of the water distribution system. These challenges are: first, to establish a water distribution system configuration that delivers the water in a profile at the top of the media such that the water exiting the media, under operating conditions, is in a profile that accounts for the heat load and water evaporation rate variation through the depth of the media (from front to back). FIGS. 4 and 7 show features of the preferred embodiment that meet the needs of this first challenge. Second, to establish a water application rate that will add water at a high enough rate to produce water streams of sufficient height to reach the spray bar distribution channels and distribution guides. This is also dependent on and must be selected to account for orifice size constraints discussed. Additionally, the water application rate must be low enough to avoid the need for very short and frequent "on" times to limit water bleed. Third, to establish a water distribution system that delivers uniform flow across the full width and depth of the media. Uniform flow across the full width of the media is achieved by controlling the ratio of orifice area to inlet flow area.

The orifice design constraints are: a) to have a composite area less than twenty-five percent (25%) of the inlet flow area; b) to be sufficiently small that enough orifices can be incorporated with the distance between the orifices being less that two inches and that rows of orifices can be incorporated with spray bar channels to apply water to the top of the media in the profile shown in FIG. 7 which matches the profile of the water evaporation rate; and c) to be sufficiently large to support efficient manufacturing with available technology and avoid bridging by scale and water entrained flotsam and other foreign particles that can pass through a reasonably sized water inlet strainer (60 mesh). The orifice sizes in the preferred embodiment meeting these criteria are 0.050" for the front spray bar and 0.040" for the back spray bar. The water flow rates for the preferred embodiment with a six foot (6') wide and six foot (6') tall media are three (3) gallons per minute (gpm) for the front spray bar and one and one half (1.5) gpm for the back spray bar.

FIG. 4 shows front and rear spray bars 88, 89, respectively, and spray bar distribution channels 94, 95 and water distribution cap 14 arranged in a configuration that produces a water application profile consistent with the minimum and maximum cycles of concentration and water evaporation profile for media of the preferred type. To develop the desired profile, given these conditions, flow control valves 34 (see FIG. 1) feeding the two spray bars are selected such that the flow rate to front spray bar 88 is about twice the flow rate to back spray bar 89. Orifices 104 (apertures) in the front spray bar are evenly spaced (such as every 1.2 inches) in two rows with the orifices in the two rows being offset in a triangular pattern to avoid interference between the streams of water from the orifices. Orifices 104 in front spray bar 88 have a diameter of 0.050 inches to achieve a desired water stream height, given the volumetric flow rate through each orifice (approximately 0.027 gpm) adequate to reach distribution cap 14 (jet 100) and spray bar channel 94 (jet 101). By having an equal number of equally sized orifices in the two rows on the front spray bar, half of this water is applied to the very front of the media and the remaining half is directed to the spray bar channel where this water is divided equally and applied to media 12. The radius of the spray bar channel is set and the center of the spray bar channel is set to apply this water approximately one inch (1") and three inches (3"), respectively, from the front of the media along its depth. Orifices 106 (apertures) in the front row of back spray bar 89 are spaced evenly at the same distance as are orifices 104 in front spray bar 88 (every 1.2 inches). The number of orifices 108 in the rear row is reduced by one half (½) of the number of orifices 106 in the front row and are spaced every 2.4 inches. The number of orifices in the two rows are offset in a triangle pattern to avoid interference between the water streams. Orifices 106, 108 have a diameter of 0.040 inches to achieve a sufficient water stream height, given the volumetric flow rate through the orifices (approximately 0.016 gpm), and are oriented to reach the back of distribution cap 14 (jet 103) and the center of spray bar channel 95 (jet 102). This configuration distributes two thirds (⅔) of the water to spray bar channel 95 and the remaining one third (⅓) is directed to the back of distribution cap 14. Both spray bar channels 94, 95 are the same with the back spray bar channel being positioned to apply one third (⅓) of the water at five inches (5") into the depth of media 12 and one third (⅓ at seven inches (7") into the depth of media. The back row of orifices 108 applies one third (⅓) of the water from the back spray bar to distribution cap 14 which conveys the water to the back edge of the media. The resulting water application profile is displayed in FIG. 7. This figure illustrates the relative distribution profile of water to the top of the media from the front of the media to the back of the media.

At conventional installations having a plurality of media modules, the media modules are aligned to form a wall-like unit. A blower is usually centrally located, which location results in air being drawn at a different rate through each module. Moreover, significant air flow variation across any of the modules is the norm. The net effect is a poorly performing installation.

FIG. 6 illustrates two evaporative cooler modules 120, 122 having air drawn therethrough by a common blower 124. Each of these modules is essentially the same as media module 80 described above. By locating each module 120, 122 centered on and perpendicular to a radius extending from the center of the blower inlet with the lateral edges of each module intersecting the perimeter of a circle defined by the length of the radius, the air flow drawn through each module is essentially the same. Thereby, the evaporative cooling effect of each module is essentially the same and the collective efficiency of multiple modules is significantly enhanced.

The combination of controls to compute and apply water at a rate that matches the water evaporation rate and the water distribution elements to match the profile of the water evaporation rate as air passes through the evaporative cooler achieves an effective once through configuration for an evaporative cooler that is able to achieve cooling performance levels beyond those achievable by recirculating coolers, achieve high cycles of concentration limiting the water discharged, achieve long pad life by avoiding scale buildup, and achieve long pad life by lowering the rate at which rigidity producing agents (regifying agents) are washed out of the media.

We claim:

1. An evaporative cooler, said evaporative cooler comprising in combination:
   a) a source of water;
   b) a media having a front side for air inflow and back side for air outflow;
   c) a device for providing a flow of air through said media;
   d) a drain pan for collecting water flowing from said media and including a drain for draining the collected water;
   e) a water distribution unit in fluid communication with said source of water for distributing water non uniformly onto said media, said water distribution unit producing a water application profile consistent with the water evaporation profile and the media fluid flow characteristics and including:
      i) a first spray bar having a first row of orifices extending longitudinally along said first spray bar for discharging first streams of water upwardly and a second row of orifices extending longitudinally along said first spray bar for discharging second streams of water generally upwardly and laterally toward said front side of said media;
      ii) a first spray bar channel for collecting and distributing the first streams of water onto said media in two rows at predetermined distances from said front side of said media;
      iii) a second spray bar having a third row of orifices extending longitudinally along said second spray bar for discharging third streams of water upwardly and a fourth row of orifices extending longitudinally along said second spray bar for discharging fourth streams of water generally upwardly and laterally toward said back side of said media;
      iv) a second spray bar channel for collecting and distributing the third streams of water onto said media in two rows at predetermined distances from the first streams of water distributed by said first spray bar channel;

v) a distribution cap for deflecting the second streams of water onto said front side of said media and said fourth streams of water onto said back side of said media.

2. An evaporative cooler as set forth in claim 1 wherein the rate of flow of water is approximately 0.027 gallons per minute through each orifice of said first and second rows of orifices.

3. An evaporative cooler as set forth in claim 1 wherein the diameter of each of said orifices in said first and second rows of orifices is approximately 0.045 inches.

4. An evaporative cooler as set forth in claim 1 wherein the rate of flow of water is approximately 0.016 gallons per minute through each orifice of said third and fourth rows of orifices.

5. An evaporative cooler as set forth in claim 1 wherein two thirds of the orifices in said second spray bar are disposed in said third row of orifices and one third of the orifices in said second spray bar are disposed in said fourth row of orifices.

6. An evaporative cooler as set forth in claim 1 wherein the diameter of each of said orifices in said second spray bar is approximately 0.040 inches.

7. An evaporative cooler as set forth in claim 1 wherein the number of orifices in said fourth row of orifices is less than the number of orifices in said third row of orifices.

8. An evaporative cooler as set forth in claim 1 wherein the number of orifices in said fourth row of orifices is one-half the number of orifices in said third row of orifices.

9. An evaporative cooler as set forth in claim 1 wherein the quantity of water flowing from said first spray bar onto said media proximate said front side of said media is greater than the quantity of water flowing from said second spray bar onto said back side of said media.

10. An evaporative cooler system as set forth in claim 1 wherein said orifices in said first and second spray bars are essentially equidistantly space from one another longitudinally along the respective one of said first and second spray bars with a distance between them that is less than the media wicking distance achieved in the media time constant.

11. An evaporative cooler as set forth in claim 1 wherein said second row of orifices are longitudinally offset from said first row of orifices to prevent the first and second streams of water from interfering with each other and the water flowing along said first spray bar channel.

12. An evaporative cooler as set forth in claim 1 wherein said fourth row of orifices are longitudinally offset from said third row of orifices to prevent the third and fourth streams of water from interfering with each other and the water flowing along said second spray bar channel.

13. An evaporative cooler as set forth in claim 1 wherein the diameter of the orifices in said first and second spray bars is greater than 0.030 inches.

14. An evaporative cooler as set forth in claim 13 wherein said constant flow valve is sized to provide the first, second, third and fourth streams of water with a height greater than six (6) inches.

15. An evaporative cooler as set forth in claim 14 wherein said constant flow valve provides a water make up rate yielding greater than seven cycles of concentration.

16. An evaporative cooler as set forth in claim 1 wherein said constant flow valve is sized to provide the first, second, third and fourth streams of water with a height greater than six (6) inches.

17. An evaporative cooler as set forth in claim 16 wherein said constant flow valve provides a water make up rate yielding greater than seven cycles of concentration.

18. An evaporative cooler as set forth in claim 1 wherein said constant flow valve provides a water make up rate yielding greater than seven cycles of concentration.

19. An evaporative cooler as set forth in claim 1 wherein the diameter of each of the orifices of said first, second, third and fourth rows of orifices is in the range of about 0.040 inches to about 0.050 inches.

20. An evaporative cooler as set forth in claim 1 including sensors responsive to the inlet conditions of temperature, relative humidity, air flow rate, altitude, cycles of concentration and providing output signals, a microprocessor responsive to the output signals for controlling the rate and profile of water evaporation.

21. An evaporative cooler as set forth in claim 20 wherein as a function of signals received from said sensors said micro processor limits the volume of water used by causing water to be distributed onto said media in a profile that matches the thermal profile and water evaporation rate of the air to be evaporatively cooled as the air travels from said front side to said back side of said media.

22. An evaporative cooler as set forth in claim 20 wherein said micro processor is adapted to cause distribution of water onto said media in a profile that results in very little or no mineral buildup and scale formation and thereby achieve maximum cooling performance and extension of the life of said media.

23. An evaporative cooler as set forth in claim 13 wherein said microprocessor is adapted to cause distribution of water onto said media in a profile that results in longer media life by wetting said media effectively to reduce scale on said media and to reduce the need for wash out of regifying agents.

24. An evaporative cooler as set forth in claim 1 including selected flow control valves, spray bar configurations and spray bar channel configurations adapted to provide a flow rate of water that corresponds with the media heat load profiles, media design and media performance characteristics.

25. A method for operating an evaporative cooler, said method comprising the steps of:
 a) providing a constant flow rate of water;
 b) establishing an evaporative cooling media having a front side for inflow of air and a back side for outflow of air;
 c) producing a flow of air through the evaporative cooling media, which evaporative cooling media includes a top surface;
 d) guiding the flow of air through the evaporative media only through the front and back sides of the evaporative cooling media;
 e) distributing the water by exercise of step a) non uniformly across the depth of the top of the evaporative cooling media in response to a predetermined water distribution profile and fluid flow characteristics of the evaporative cooling media;
 f) collecting water dripping from the evaporative media in a drain pan;
 g) draining the water from the drain pan;
 h) sensing the instantaneous evaporation rate of the water distributed to the evaporative cooling media; and
 i) metering the flow of water to the evaporative cooling media in response to exercise of said step h).

26. The method as set forth in claim 25, including the step of controlling operation of said step i) in response to a preselected cycle of concentration.

27. The method as set forth in claim 25, including the step of determining the water discharge upon exercise of said step f) and modifying exercise of said step i) in response thereto.

28. The method as set forth in claim 25 wherein said step e) includes the step of distributing a plurality of rows of streams of water along the top of the evaporative cooling media.

29. The method as set forth in claim 25 wherein said step e) includes the step of distributing water to the front side and to the back side of the evaporative cooling unit.

30. The method as set forth in claim 29 wherein said step e) includes the step of distributing a plurality of rows of streams of water along the top of the evaporative cooling media.

31. The method as set forth in claim 25 wherein exercise of said step h) produces a plurality of signals and including the step of correlating the signals with a microprocessor to produce commands for exercise of said steps a), c) and e).

32. The method as set forth in claim 25 wherein exercise of said step e) includes the step of distributing more water proximate the front side of the evaporative cooling media than the water distributed proximate the back side of the evaporative cooling media.

33. The method as set forth in claim 25 wherein exercise of step c) includes the step of drawing air through the evaporative cooling media.

* * * * *